United States Patent [19]

Himmelbauer et al.

[11] 4,249,215
[45] Feb. 3, 1981

[54] TELEVISION CAMERA COMPRISING A PICK-UP TUBE

[75] Inventors: Erich E. Himmelbauer; Willem J. Lohuis, both of Eindhoven, Netherlands

[73] Assignee: U.S. Philips Corporation, New York, N.Y.

[21] Appl. No.: 45,553

[22] Filed: Jun. 4, 1979

[30] Foreign Application Priority Data

Jun. 30, 1978 [NL] Netherlands .................. 7807072

[51] Int. Cl.³ .......................................... H04N 5/34
[52] U.S. Cl. ................................. 358/217; 358/223
[58] Field of Search ............... 358/217, 50, 223, 219; 313/384, 390, 446

Primary Examiner—John C. Martin
Attorney, Agent, or Firm—Thomas A. Briody; William J. Streeter; Edward W. Goodman

[57] ABSTRACT

A television camera comprising a pick-up tube provided with a directly heated cathode which is connected to a heater voltage source which is implemented as a pulse voltage source, the pulse heater voltage being present in at least a portion of the line blanking periods and absent in the line scanning periods. This enables the use in the pick-up tube of a directly heated cathode which has a higher efficiency between the electron emission and heater voltage power than an indirectly heated cathode.

11 Claims, 6 Drawing Figures

TELEVISON CAMERA COMPRISING A PICK-UP TUBE

BACKGROUND OF THE INVENTION

The invention relates to a television camera comprising a pick-up tube which is provided with a cathode for emitting, while being heated, an electron beam, with a control electrode for the electron beam and a target plate which is scanned line-by-line and field-by-field with periodical scanning and blanking periods by the electron beam under the control of deflection means.

Such television cameras comprising pick-up tubes are generally known. Depending on whether the camera is intended for use in black-white or color television, one or more pick-up tubes can be used, which are offered by pick-up tube manufactures in data handbooks. Thus, a choice for the pick-up tube or tubes can be made from the Philips "Data Handbook, Electron Tubes" under the heading "Camera tubes". From the present data it appears that the offered pick-up tubes are provided with an indirectly heated cathode in the electon gun, a heating filament, which is free from the cathode, being connectable to an a.c. voltage source or a d.c. voltage source of, typically, 6.3 V and, depending on the tube type, with two typical heater current values of 300 mA and 95 mA. Herefrom it follows that in the case of connection to a d.c. voltage source, the filament consumes, for the indirect heating of the cathode, a heater voltage power equal to 1.9 W and 0.6 W, respectively.

SUMMARY OF THE INVENTION

It is an object of the invention to provide a television camera in which pick-up tubes can be used which are not provided with an indirectly heated cathode in an electron gun but with a directly heated cathode which requires a lower heater voltage power, that is to say they have a greater efficiency. To this end the camera according to the invention is characterized in that, when a pick-up tube is used comprising a directly heated cathode provided with a cathode filament which is connected for heating purposes to a heater voltage source, the heater voltage source is a pulse voltage source, the pulse heater voltage being present in at least a portion of the line blanking periods and absent in the line scanning periods.

In practice the use without further measures, of a directly, instead of an indirectly, heated cathode in the electron gun of a pick-up tube, that is to say when a heater voltage source having a constant d.c. voltage is connected without further measures to the cathode filament, results in that the pick-up tube produces a picture signal which has a poor picture quality on display; the resolution being decreased and after-glow, produced by inertia phenomena, is caused resulting in smears behind moving scene portions.

One cause thereof is the (heater) voltage drop produced across the cathode filament. This causes the electron emission from the cathode filament to be effected from places having a different electric voltage. It can be assumed that a voltage difference of, for example, 2 V to 3 V occurs between the two points of the cathode filament which are connected to terminals of the constant d.c. voltage source. The emitted electrons have an energy difference corresponding to the local voltage difference, so that the electron energy distribution in the electron beam is widened with respect to the electron energy distribution present at a cathode having a uniform voltage. The spread, associated with the electron energy distribution, in the velocities of the electrons in the beam affects the velocity at which target plate stabilisation is effected during scanning and is, consequently, a source of inertia phenomena. Due to the widening of the energy distribution, the voltage drop across the cathode filament gives an increase in inertia phenomena. In addition, the increased energy in the electron beam caused by the voltage difference causes an increase in the beam diameter of the electron beam which results in a poor resolution on display of the produced picture signals.

It should be noted that the described problem does not occur when the cathode in television display tubes is heated directly. In television display tubes an a.c. voltage as well as a d.c. voltage supply can be used with an indirectly or a directly heated cathode; the effect of some volts on the local cathode voltage at the directly heated cathode is fully insignificant with respect to the final anode voltage of 15 kV to 25 kV in the display tube.

When, according to the invention, the heater voltage across the cathode filament is only applied in the line blanking periods, for the entire duration or for a portion thereof, this has some influence on the temperature variation of the cathode filament in the intermediate line scanning periods. The variation of the cathode filament temperature in the line scanning periods is only 5 to 10% because of the thermal inertia of the cathode, which does not have any noticeable consequences on the display of the picture signal generated by the pick-up tube and is, consequently, allowable.

To realise a temperature variation of the cathode filament which is as uniform as possible, the camera is characterized in that the line-frequency periodicity of the pulse heater voltage source is the same in the field scanning periods and in the field blanking periods.

A camera provided with a simple implementation of the pulse heater voltage source with which, if so desired, further voltages can be applied to the cathode, is characterized in that the pulse heater voltage source comprises a first and a second voltage source the outputs of which are connected to a first and to a second cathode filament terminal, respectively, the first and the second voltage source being provided with an input for receiving a first line-frequency switching signal, whereas the second voltage source is also provided with an input which is connected to the output of a third voltage source present in the pulse heater voltage source, for supplying the pulse heater voltage, said third voltage source being provided with an input for receiving a second line-frequency switching signal.

A camera comprising a pulse heater voltage source through which furthermore the so-called cathode-blanking of the electron beam in the pick-up tube can be effected, is characterized in that each one of the first and the second voltage sources in the pulse heater voltage source is provided with an input which is connected to the output of a fourth voltage source which is present in the pulse heater voltage source and which is provided with an input for receiving a switching signal having line-frequency pulses in a field scanning period and a pulse of the duration of the field blanking period, the fourth voltage source being active for the production of pulses which blank the electron beam in the pick-up tube, whereas the terminal of the control electrode is further connected to the output of a fifth voltage source which supplies a constant, adjustable d.c. voltage.

A camera comprising a pulse heater voltage source which, on the contrary, operates with control electrode blanking, is characterized in that the terminal of the control electrode is connected to the output of a fourth voltage source which is provided with an input for receiving a switching signal having line-frequency pulses in a field scanning period and having a pulse of the duration of the field blanking period, which fourth voltage source is active to produce pulses which blank the electron beam in the pick-up tube, whereas the terminal of the control electrode is further connected to the output of a fifth voltage source which produces a constant, adjustable d.c. voltage.

A camera comprising a pick-up tube suitable for anti-comet tail (ACT) operation is characterized in that each one of the first and the second voltage sources in the pulse heater voltage source is provided with an input which is connected to the output of a sixth voltage source which produces a constant, adjustable d.c. voltage, and that a seventh voltage source is provided an input of which is connected to the output of the sixth voltage source and the output of which is connected to the terminal of the control electrode, the seventh voltage source being provided with an input for receiving a switching signal having line-frequency pulses in a field scanning period.

A camera comprising a pick-up tube suitable for ACT-operation and operating with control electrode blanking the electron beam is further characterized in that the output of the sixth voltage source is connected to an input of the third voltage source present in the pulse heater voltage source.

DESCRIPTION OF THE DRAWINGS

The invention will be further explained with reference to the following figures which are given by way of example, in which.

DESCRIPTION OF THE PREFERRED EMBODIMENTS

Figure 1:
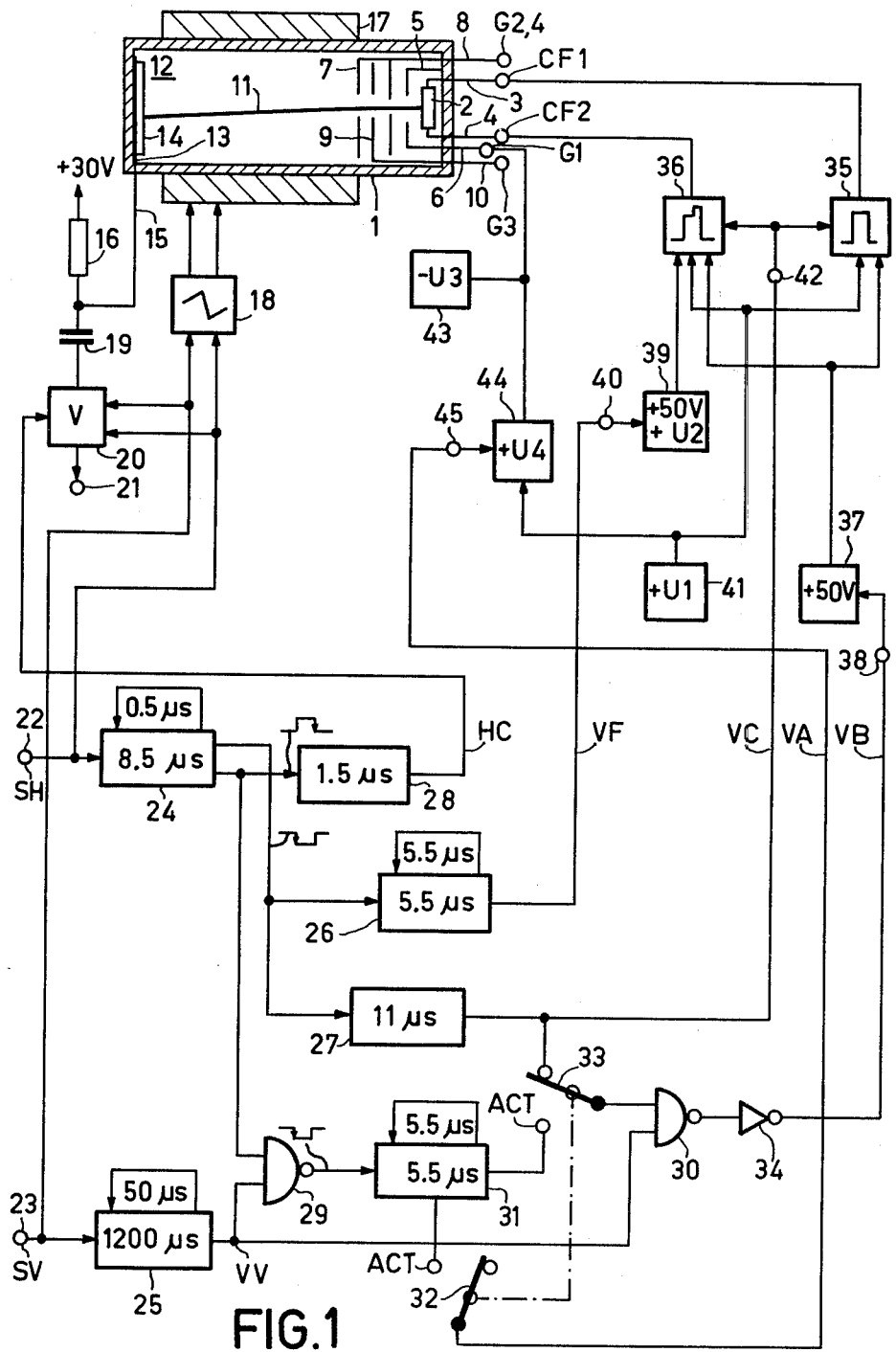
FIG. 1 shows a block-diagrammatic view of an embodiment of a television camera according to the invention, which operates with cathode blanking.
Figure 3:
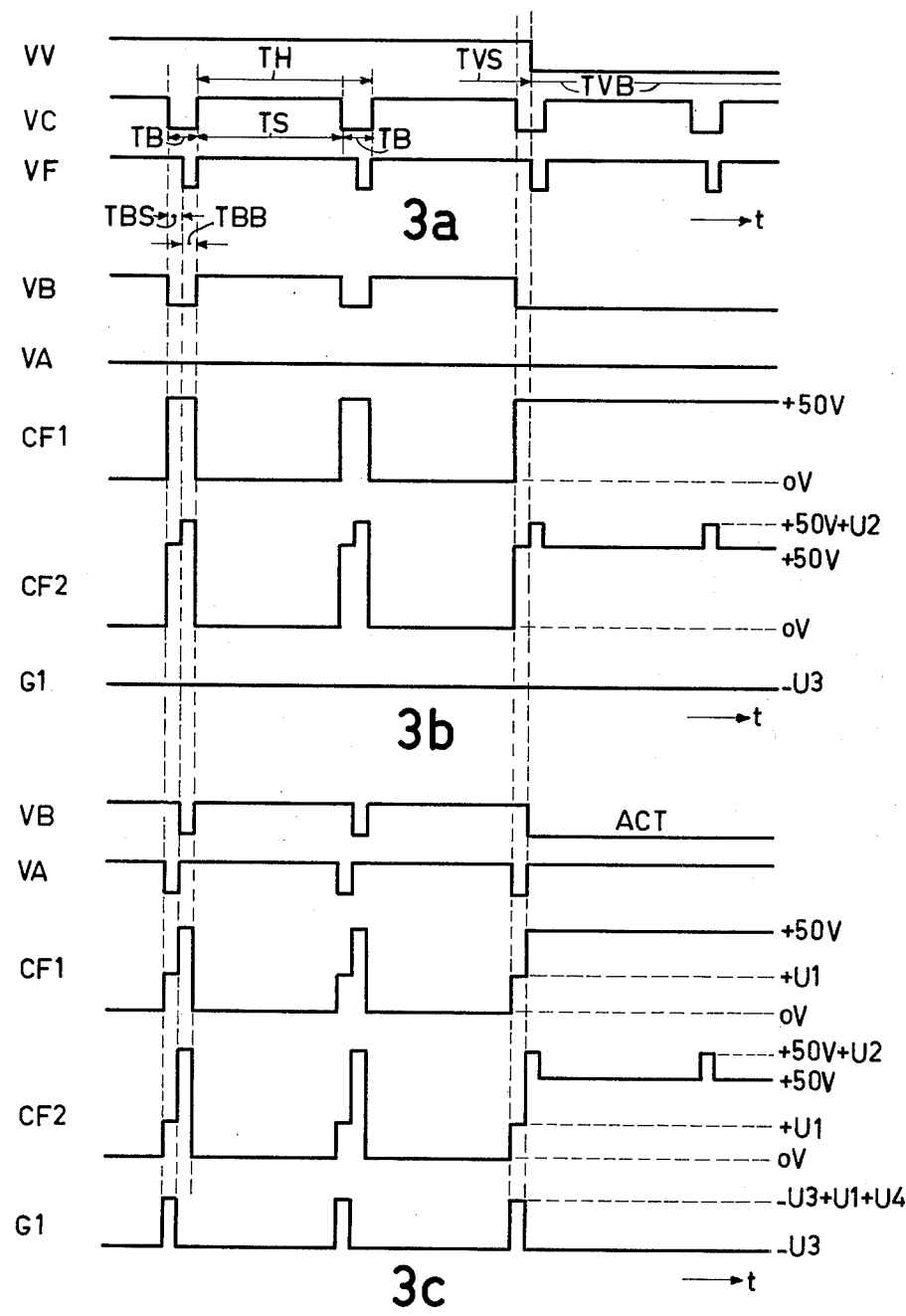
FIGS. 3a, 3b and 3c show some signals occurring as a function of the time in the camera shown in FIGS. 1 and 2.

In FIG. 1 reference numeral 1 denotes a television pick-up tube wherein, partly, there are shown a directly heated cathode filament 2, provided with a first and a second electrode filament terminals 3 and 4, a control electrode 5 provided with a terminal 6, an accelerating electrode 7 consisting of two electrodes and provided with a terminal 8 and a lens electrode 9 provided with a terminal 10, the electrode 9 having been provided between the two electrodes of the composite electrode 7. The cathode (2,3, 4) and the electrodes 5, 7 and 9 constitute together with the terminals 6, 8 and 10 an electron gun (2-10) which is thus implemented as an anti-comet-tail (ACT) electron gun. Under the influence of voltages to be applied to the terminals 3, 4, 6, 8 and 10, the electron gun (2-10) produces an electron beam 11 in line scanning periods TS, and, when operating as an ACT-gun, in a portion TBS of line blanking periods TB of line periods TH occurring in a field scanning period TVS. The above mentioned periods are shown in FIG. 3a at some signals plotted versus the time t. By way of example it holds that the periods TH and TB, respectively, are equal to 64 and 11 $\mu$s, respectively, TBB in FIG. 3a denotes a beam blanking period in which the gun (2-10), in the case of ACT-operation, does not generate an electron beam 11, while, then the ACT operation is switched off, the electron beam 11 is blanked during the entire line blanking period TB. TVB denotes a field blanking period comprising, for example, 20 line periods TH in which beam blanking is likewise effected. A field period, consisting of the periods TVS, and TVB is not further indicated. During ACT operation the gun (2-10) produces in known manner during the retrace period TBS the electron beam 11 with an increased current strength and cathode voltage to prevent comet tails from being produced on display behind bright, moving portions in a televised scene. For a detailed description of a pick-up tube with ACT operation reference is made to U.S. Pat. No. 3,548,250, while automatic adjustments at the ACT pick-up tube are given in U.S. Pat. No. 3,931,466 and 3,955,116.

The electron beam 11 generated by the electron gun (2-10) in the pick-up tube 1 is incident on a target plate 12, which is implemented from a transparent, electrically conducting signal electrode 13 and a semiconductor layer 14. The signal electrode 13 is connected to a terminal 15 which is connected outside the pick-up tube 1, through a resistor 16, to a terminal carrying a voltage of +30 V of a voltage source, another terminal of which is assumed to be connected to ground, which also applies to other voltage-carrying terminals. Further electrodes which are normally present in the pick-up tube 1 are not shown as they are irrelevant for explaining the invention.

The target plate 12 is scanned line-by-line and field-by-field by the electron beam 11 under the control of a deflection means 17. The deflection means 17 is shown in FIG. 1 as an electro-magnetic deflection means provided outside the pick-up tube 1. Instead, an electrostatic deflection means might likewise be applied. In addition, focusing and correction means, not shown, are provided. In FIG. 1 the deflection means 17 is connected to outputs of a deflection signal generator 18, inputs of which are supplied with a line synchronising signal SH and a field synchronising signal SV. When the signals SH and SV are applied to the generator 18, it applies line and field deflection signals to the deflection means 17. In response to the line-by-line and field-by-field scanning of the target plate 12 by the electron beam 11, a picture signal is produced at the terminal 15, which signal corresponds to a potential picture, present at the free surface of the semiconductor layer 14, of a scene to be televised and which has been produced because scene light has penetrated into the semiconductor layer 14 through the transparent signal electrode 13. The local intensity of the light originating from the scene determines locally a photo-electric leakage current from which the potential image ensues.

The picture signal occurring at the terminal 15 is applied to an input of an amplifier 20 through a capacitor 19. The amplifier 20 is shown in a general sense and comprises, for example, a pre-amplifier, amplifiers with black-level clamping, limiting circuits, a gamma amplifier, an aperture correction circuit etc. To perform the various signal processing operations, control signals are applied to the amplifier 20, three control signals being shown in FIG. 1 by way of example such as the line synchronising signal SH, the field synchronising signal SV and a line clamping signal HC. It is assumed that the amplifier 20 produces at an output 21 a video signal or a television signal directly suitable for transmission and transfer.

To generate the signal at the output 21 the line (SH) and the field synchronising signal SV supplied to inputs 22 and 23 are applied to monostable multivibrators 24 and 25, respectively. A falling pulse edge in the line synchronising signal SH, occurring at the beginning of a line blanking period TB, results in that the multivibrator 24 changes state after 0.5 $\mu$s and, then changes back to its original state after 8.5 $\mu$s. The multivibrator 24 is provided with two outputs at which the pulses having a duration of 8.5 $\mu$s occur with opposite polarities as shown in FIG. 1. The output of the multivibrator 24 at which a falling pulse edge is present after the above mentioned 0.5 $\mu$s, is connected to the inputs of multivibrators 26 and 27. The output of the multivibrator 24 on which the falling pulse edge is present after a total period of time of 9 $\mu$s is connected to the input of a multivibrator 28 and an input of a NAND-gate 29. Another input of the gate 29 is connected to the output of the multivibrator 25, which carries a signal VV, and which in turn is further connected to an input of a NAND gate 30. The multivibrator 28 applies the line clamping signal HC to the amplifier 20, this signal having a pulse of 1.5 $\mu$s after a total period of time of 9 $\mu$s after the falling pulse edge in the line synchronising signal SH. The multivibrator 26 produces a pulse of a duration of 5.5 $\mu$s in a signal VF, shown in FIG. 3a, 5.5 $\mu$s after the falling pulse edge in the output signal of the multivibrator 24, that is to say after a total period of time of 6 $\mu$s. It appears that the beam blanking period TBB has a duration of 5.5 $\mu$s. After the falling pulse edge in the output signal of the multivibrator 24, the multivibrator 27 produces a pulse of a duration of 11 $\mu$s in a signal VC which is likewise shown in FIG. 3a. It appears that the line blanking period TB has a duration of 11 $\mu$s. Furthermore, the signal VV produced by the multivibrator 25 is plotted in FIG. 3a. In the signal VV a pulse of a duration of 1200 $\mu$s is produced 50 $\mu$s after a falling pulse edge in the field synchronizing signal SV, which corresponds to the beginning of a field blanking period. For a given duration of one line period TH, equal to 64 $\mu$s, a negative pulse is produced in the signal VV during 18.75 line periods TH, causing the gates 29 and 30 to be cut-off during the field blanking period TVB. A field period (TVS+TVB), not shown, lasts for, for example, 20 ms.

The output of the gate 29 is connected to an input of a multivibrator 31 which comprises two outputs which are connected to selection contacts, denoted by ACT, of change-over switches 32 and 33, respectively, switches 32 and 33 being mechanically coupled. In addition, the changeover switch 32 has a free selection contact, while the second selection contact of the change-over switch 33 is connected to the output of the multivibrator 27. The master contact of the change-over switch 33 is connected to an input of the gate 30, the output of which is connected to an input of an inverter 34. The output of the inverter 34 carries a signal VB while the master contact of the change-over switch 32 carries a signal VA, which signals are plotted in FIG. 3c for the situation in which the selection contacts ACT are connected through, and in FIG. 3b if the other selection contacts, as shown in FIG. 1, are connected through. In the position shown in FIG. 1 of the change over switches 32 and 33, the inverter 34 produces a signal VB, which is equal to the signal VC in the field blanking period TVS. In the field blanking periods TVB, the gate 30 is cutoff and a logic O, which corresponds to a lower voltage, is present in the signal VB. In the position of switch shown in the FIG. 1, no pulses are present in the signal VA due to the connection to the free contact. In the ACT switch positions the multivibrator 31 produces a pulse of a duration of 5.5 $\mu$s in the signal VA (FIG. 3c) by means of the switch 32, while the multivibrator 31 likewise produces a pulse of a duration of 5.5 $\mu$s in the signal VB by means of the switch 33.

For the application of voltage to the cathode filament 2 of the pick-up tube 11, the cathode filament terminals 3 and 4 are connected to the outputs of a voltage sources 35 and 36, respectively. An input of each of the voltage sources 35 and 36 is connected to the output of a voltage source 37, to which the signal VB is applied as a switching signal through an input 38. Depending on the signal VB, the voltage source 37 produces a voltage of +50 V or 0 V. The output of a voltage source 39, to which the signal VF is applied as a switching signal through an input 40, is connected to an input of the voltage source 36. Depending on the signal VF, a voltage of (+50 V +U2) or 0 V occurs at the output of the voltage source 39. Another input of each of the voltage sources 35 and 36 is connected to the output of a voltage source 41 which produces a constant, adjustable d.c. voltage +U1, while the signal VC is applied as a switching signal to the voltage sources 35 and 36 through an input 42. With the described signals being applied, the voltage sources 35 and 36 apply a switched-mode voltage to the cathode filament terminals 3 and 4 which are plotted in FIG. 3b (non-ACT-operation) and FIG. 3c (ACT-operation) as the voltages CF1 and CF2. The voltage sources 35, 36, 37 and 39 constitute a pulse heater voltage source (35, 36, 37, 39) for applying a pulse heater voltage +U2 to the directly heated cathode (2, 3, 4). In addition, the voltage source 37 is present for performing a cathode blanking of the electron beam 11. The voltage source 41 is present for enabling the ACT operation.

The terminal 6 of the control electrode 5 is connected to the output of a voltage source 43, which produces a constant, adjustable d.c. voltage −U3, and to the output of a voltage source 44, to which the signal VA is applied as a switching signal through an input 45. The output of the voltage source 41 is further connected to an input of the voltage source 44. In the case of non-ACT-operation, the voltage source 44 is inoperative and the constant d.c. voltage G1, shown in FIG. 3b and having the value −U3, is present at the control electrode 5. In the case of ACT operation, the voltage sources 41 and 44 contribute their share because the voltage G1, in the line retrace period TBS in the field scanning period TVS, gets the value (U3 +U1 +U4) in the manner shown in FIG. 3c. Since the d.c. voltages required for the electrode terminals 8 and 10, namely voltages G2,4 and G3, are irrelevant for the explanation of the invention, they are not further shown. In the case of ACT operation, the voltage G3 is pulse-shaped whereas, while in the case of non-ACT operation, the voltages G2,4 and G3 are constant.

From the voltages CF1 and CF2, shown in FIG. 3b for non-ACT operation, it follows that during the entire line blanking periods TB, the voltage of +50 V at the two cathode filament terminals 3 and 4 prevents the electron beam 11 from being generated (cathode blanking) and also that the additional supply during the period of time TBB of the voltage with value +U2 to the cathode filament terminal 4 (voltage CF2), produces the heater voltage for the filament 2. In the line scanning periods TS in the field scanning period TVS, the two cathode filament terminals 3 and 4 are supplied with the OV ground potential.

For ACT operation it follows, from the voltages CF1, CF2 and G1 of FIG. 3c, that during the line retrace periods TBS in the field scanning period TVS, the voltage U1 is applied to both cathode filament terminals 3 and 4, while the voltage G1 is supplied with the voltage ($-U3 + U1 + U4$) which is less negative with respect to $-U3$. The ACT operation with the increased cathode potential (+U1) and the increased current strength (pulse in voltage G1) is then effected. In the subsequent beam blanking periods TBB the +50 V voltage, which blanks the electron beam 11, is applied to the cathode filament terminal 3 and the +U2 higher voltage is applied as the heater voltage of the cathode filament terminal 4, while the voltage G1 is equal to $-U3$.

In the field blanking periods TVB, there is no difference between non-ACT operation (FIG. 3b) and ACT-operation (FIG. 3c) for the voltage CF1, CF2 and G1, the +U2 heater voltage with respect to the voltage +50 V being applied to the cathode filament terminal 4.

In view of the fact that it is simple to switch over from ACT operation to non-ACT operation, wherein ACT operation implies that no supply of heating voltage power may occur in the first portion TBS of the line blanking period TB, the supply of the heater voltage is effected in the cameras shown in FIG. 1, also in the case of non-ACT-operation, in the periods of time TBB only. If the described simple change-over feature is refrained from, the whole line blanking period TB can be utilised for the supply of the heater voltage power.

Figure 2:
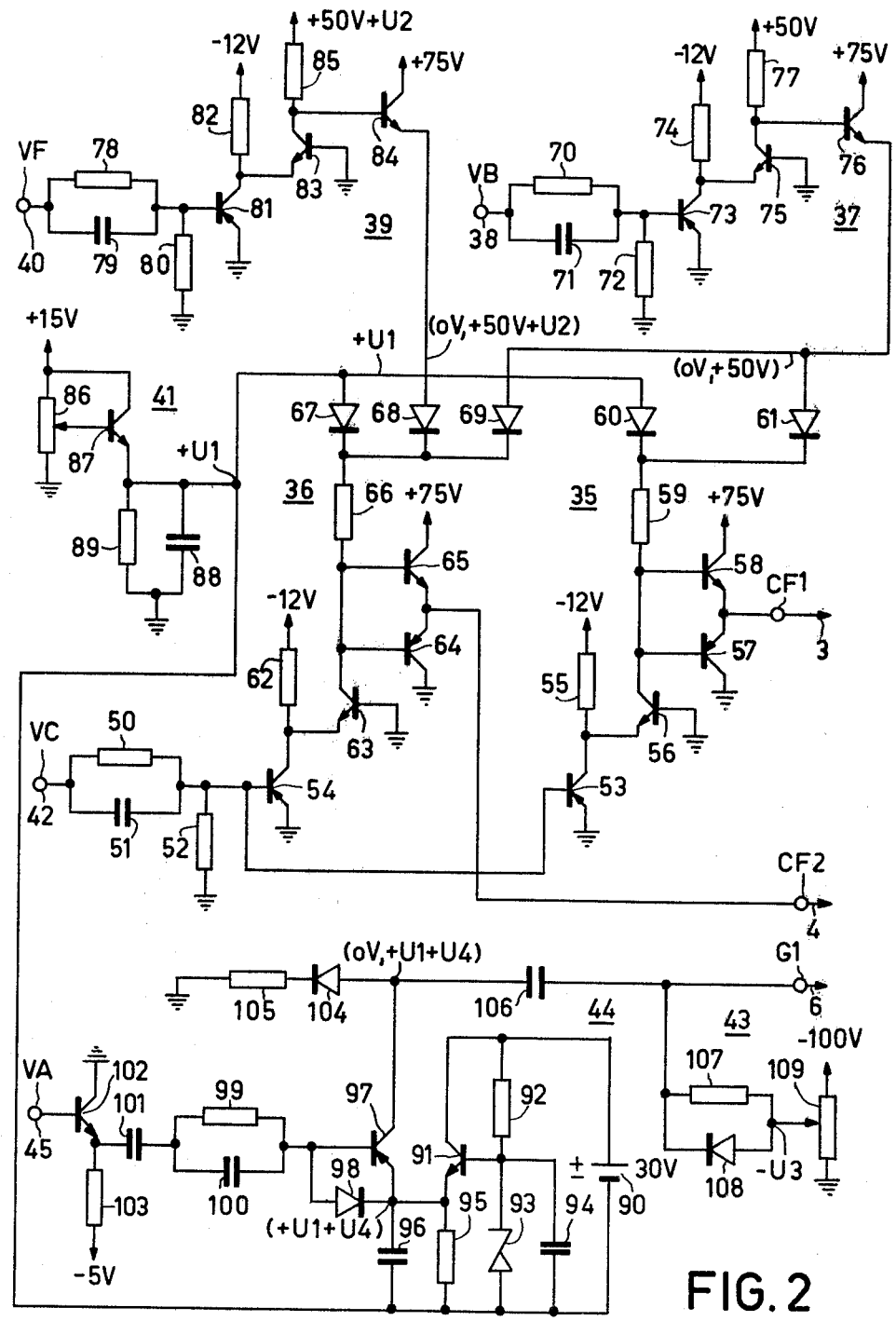
FIG. 2 shows some blocks of FIG. 1 in greater detail.

FIG. 2 shows detailed embodiments of voltage sources 35, 36, 37, 39, 41, 43 and 44 of FIG. 1. FIG. 2 employs the same reference numbers as used in FIG. 1. In FIG. 2 the voltage sources 35 and 36 are shown with a common preliminary stage in the form of a parallel arrangement of a resistor 50 and a capacitor 51 which is connected to the input 42 and, by means of its other end, to ground through a resistor 52. The junction of the resistors 50 and 52 and of the capacitor 51 is connected, in the voltage sources 35 and 36, respectively, to the base of pnp transistor 53 and 54, respectively. The downgoing pulses shown in the signal VC in FIG. 3a render the transistors 53 and 54 conductive in the line blanking period TB, the transistors being cut off outside these periods by the voltage across the capacitor 51. Through a resistor 55 the collector of the transistor 53 is connected to a terminal which carries a voltage of $-12$ V and to the emitter of a npn transistor 56, whose base is connected to ground. The collector of the transistor 56 is connected to the base of a pnp transistor 57 and to the base of a pnp transistor 58 while there is a connection to the cathodes of two diodes 60 and 61 through a resistor 59. The collectors of the transistors 57 and 58, respectively, are connected to a ground and to a terminal carrying a voltage of +75 V, respectively, while the emitters thereof are interconnected and in turn connected to the terminal 3. In like manner the transistor 54 in the voltage source 36 is coupled to a resistor 62, a npn transistor 63, a npn transistor 64 and a npn transistor 65, a resistor 66 and to three diodes 67, 68 and 69, instead of two diodes. The anodes of the diodes 60 and 67 are interconnected and are in turn connected to the output having the voltage +U1 of the adjustable voltage source 41. The anodes of the diodes 61 and 69 are interconnected and are in turn connected to the output of the voltage source 37. The anode of the diode 68 is connected to the output of the voltage source 39.

The voltage source 37 is provided with a parallel arrangement of a resistor 70 and a capacitor 71 connected to the input 38 and, by means of the other ends thereof, to ground through a resistor 72. The junction of the resistors 70 and 72 and the capacitor 71 is connected to the base of a pnp transistor 73. The collector of the transistor 73 is connected to a terminal carrying a $-12$ V voltage through a resistor 74 and to the emitter of a npn transistor 75, which is connected to ground at the base thereof. The collector of transistor 75 is connected to the base of a npn transistor 76 and, through a resistor 77, to a terminal carrying a +50 V voltage. The collector of the transistor 76 is connected to a terminal carrying a +75 V voltage; the emitter being connected to the anodes of the diodes 61 and 69, respectively.

The following description is given to explain the operation of the voltage source 37, wherein, here and in subsequent explanations, for simplicity of the description, voltage drops across base-emitter junctions and collector-emitter junctions, respectively, of transistors, across anode-cathode junctions for diodes and across current-conducting resistors, have been left out of account. In the presence of the higher voltage in the signal VB (FIGS. 3b and 3c) the transistor 73 is cutoff, so that the transistor 75 conducts and the collector of the transistor 75 carries approximately the ground potential present at the base, this ground potential also being present at the emitter of the transistor 75 and, consequently, at the anodes of the diodes 61 and 69. The transistor 73 conducts at the lower voltage in the voltage VB, the transistor 75 then being cut off and the voltage of approximately +50 V, present at the base of the transistor 76, results in the same voltage at the emitter thereof and, consequently, at the anodes of the diodes 61 and 69. The above-described operation of the voltage source 37 is illustrated in FIG. 2 by (0 V, +50 V).

The voltage source 39 is implemented in the same manner as the voltage source 37, the components 70 to 77, inclusive, of the voltage source 37 having been given the reference numerals 78 to 85, inclusive, for the voltage source 39. The difference between the voltage sources 37 and 39 resides in the fact that, while the terminal of the resistor 77 is connected to the terminal which carries the +50 V voltage, the corresponding resistor 85 in the voltage source 39 is connected to a terminal which carries a voltage of +50 V +U2. The signal VF is applied as the switching signal to the input 40 of the voltage source 39. For the switched power supply of voltage source 39, it follows that it applies the ground potential or the voltage (+50 V +U2) to the anode of the diode 68, which is illustrated in FIG. 2 by (0 V, +50 V +U2).

The adjustable voltage source 41 comprises a potentiometer 86, arranged between a terminal which carries a voltage of +15 V and ground. The tap of the potentiometer 86 is connected to the base of a npn transistor 87, the collector of which is connected to the terminal which carries the +15 V voltage and the emitter thereof to ground through a parallel arrangement of a capacitor 88 and a resistor 89. The junction of the transistor-emitter, the capacitor 88 and the resistor 89, which junction carries the voltage +U1, is connected to the anodes of the diodes 60 and 67. In addition, the junction with the voltage +U1 is connected to a (−) terminal of a constant d.c. voltage source 90, present in the voltage source 44.

In the voltage source 44 the (+) terminal of the d.c. voltage source 90, which carries a 30 V higher voltage is connected directly to the collector of a npn transistor 91 and to the base thereof through a resistor 92. The base of transistor 91 is connected to the (−) terminal of the source 90 through a zener diode 93 in parallel with a capacitor 94, while the emitter thereof is connected to the (−) terminal through a resistor 95 in parallel with a capacitor 96. The junction of the transistor-emitter, the capacitor 96 and the resistor 95 carries a voltage (+U1 +U4), the voltage U4 being determined by the zener diode 93. The junction with the voltage (+U1 +U4) is connected to the emitter of a pnp transistor 97 and to the cathode of a diode 98, which is connected to the transistor 97 base at the anode thereof. In addition, the base of the transistor 97 is connected to the emitter of a npn transistor 102 through a parallel arrangement of a resistor 99 and a capacitor 100 in series with a capacitor 101. The emitter of the transistor 102 is connected to terminal, which carries a −5 V voltage, through a resistor 103 and the collector and the base, respectively, are connected to ground and to the input 45, respectively. The collector of the transistor 97 is connected to the anode of a diode 104, the cathode thereof being connected to ground through a resistor 105. The junction of the collector of the transistor 97 and the anode of the diode 104 is connected, through a capacitor 106, to the terminal 6, which is further connected to the voltage source 43 and connected therein to the tap of a potentiometer 109 through a parallel arrangement of a resistor 107 and a diode 108. The potentiometer 109 is provided between a terminal which carries a voltage of −100 V, and ground, the potentiometer tap which carries an adjustable voltage −U3 being connected to the anode of the diode 108.

In the case of non-ACT-operation, the input 45 is free, that is to say no signal VA with switching pulses is applied to it. In this situation the capacitors 100 and 101 carry a voltage, so that the transistor 97 is cutoff and the ground potential of 0 V is present at the anode of the diode 104. The voltage −U3 is then present at the terminal 6. The voltage G1 has the shape shown in FIG. 3b.

In the case of ACT operation, the signal VA, shown in FIG. 3c, occurs at the input 45. At the higher voltage in the signal VA the transistor 102 conducts, the transistor 97 being cut-off, so that it follows from the preceding description that the voltage G1 is equal to −U3. The pulse-shaped, lower voltage in the signal VA blocks the transistor 102, causing the more negative voltage at the emitter of the transistor 102 to render transistor 97 conductive through the capacitors 101 and 100 and which produces the voltage (+U1 +U4) at the collector of the transistor 94. This is indicated in FIG. 2 by (0V, +U1 +U4). The voltage jump equal to (+U1 +U4) is present in the voltage G1, as shown in FIG. 3c, through the capacitor 106.

In the case of non-ACT operation (FIG. 3b and FIG. 3a) the voltage sources 35 and 36 operate as follows. In the field scanning period TVS, the falling, line-frequency pulses in the signals VC and VB are produced during the entire line blanking periods TB, while those in the signal VF are produced only in the second half thereof, during the periods of time TBB. In the line scanning periods TS the transistors 53, 54, 73 and 81 are cut-off by the higher voltage in the signals VC, VB and VF. The transistors 56, 63, 75 and 83 are then conductive. The somewhat negative voltage or substantially the ground potential, present at the bases of the transistors 57 and 58, 64 and 65, 76, 84 results in that the transistors 57 and 64 conduct and that the transistors 58, 65, 76 and 84 are cut-off. In this situation approximately the OV ground potential is present in the voltages CF1 and CF2 at the terminals 3 and 4, respectively, and in the voltage at the anodes of the diodes 61, 69 and 68.

The lower voltage produced in the signals VC and VB in the periods of time TBS renders the transistors 53, 54 and 73 conductive. The transistors 56, 63 and 75 are cut-off in response thereto. Cutting off the transistor 75 results in that the +50 V voltage at the collector thereof is passed on to the bases of the transistors 57 and 58 through the transistor 76, the diode 61 and the resistor 59, causing the transistor 57 to be cut-off and the transistor 58 to become conductive, which results in a voltage value of approximately +50 V in the voltage CF1 at the terminal 3. The same occurs at the bases of the transistors 64 and 65 through the diode 69 and the resistor 66, so that the voltage value of approximately +50 V is also produced in the voltage CF2 at the terminal 4. Thereafter the lower voltage is also produced in the signal VF (FIG. 3a) in the immediately subsequent period of time TBB. In response thereto the voltage (+50 V +U2) is passed on in the manner described for voltage source 37 to the base of the transistor 65 through the conducting transistor 84, the diode 68 and the resistor 66, which gives approximately the voltage value (+50 V +U2) in the voltage CF2 at the terminal 4. Consequently, the voltage U2 is present between the cathode heater terminals 3 and 4, causing the cathode filament 2 to be heated.

In the field blanking perod TVB, the lower voltage in the signal VB (FIG. 3b) causes the approximately +50 V voltage, supplied by the voltage source 37, to be present at the bases of the transistors 57, 58 and 64, 65 during the entire period of time TVB. The voltage value of approximately +50 V occurs in the voltages CF1 and CF2 through the conducting transistors 58 and 65, while the transistors 57 and 64 remain in the cut-off state, independent of the falling pulses in the signal VC at the input 42. The falling pulses in the signal VF at the input 40 ensure that the voltage value (+50 V +U2) is produced in the voltage CF2 by means of the diode 68, also in the field blanking period TVB. It appears that the line-frequency periodicity of the heater voltage supply (+U2) of the cathode filament 2 is continued in the field blanking periods TVB, which results in as uniform a temperature behaviour of the cathode filament 2 as possible, independent of the field periodicity.

The following applies to the operation of the voltage sources 35 and 36 in the case of ACT-operation (FIG. 3c and 3a). The result of the falling pulses in the signal VA at the input 45 of the voltage source 44 has already been described above and it was proved that the voltage G1, shown in FIG. 3c, is produced at the terminal 6. In the field scanning period TVS falling pulses are produced in the signal VC in the entire line blanking periods TB, while the falling pulses in the signal VB are only produced in the second half thereof, in the beam blanking periods TBB. The lower value in the signal VC during the first half of the periods of time TB, the line retrace periods TBS, result in that the transistors 58 and 65 conduct and the transistors 57 and 64 are cut-off. The voltage +U1, which is higher than the 0 V voltage at the anodes of the diodes 61, 69, 68 is present at the anodes of the diodes 60 and 67. In response thereto the voltage +U1 is present in the voltages CF1 and CF2, as shown in FIG. 3c. Thereafter the lower voltage is present in the signals VB and VF at the inputs 38 and 40, respectively, in the beam blanking perod TBB. In response thereto the voltage source 37 and 38, respectively, produces the voltage +50 V (+50 V +U2), respectively. These voltage values are approximately present in the voltages CF1 and CF2 through the diodes 61 and 68 and the transistors 58 and 65.

For the description of the operation for ACT-operation in the field blanking period TVB, reference is made to the above description, as it does not deviate from the description for non-ACT-operation (FIG. 3b).

It appears that also for ACT-operation the line-frequency pulse heater voltage supply (+U2) is effected in both the field scanning periods TVS and in the field blanking periods TVB.

From the implementation of the voltage source 41 (shown in FIG. 2), it follows that the voltage +U1 is adjustable between 0 and 15 V, this adjustment depending on the capacitance of the target plate 12 and the desired peak-white value in the picture signal and in the video signal, respectively. From the shown implementation of the voltage source 43, it follows that the voltage −U3 is adjustable between 0 and −100 V. A positive voltage (+U1 +U4) produced by the voltage source 44 is added thereto. The voltage U4 is determined by the zener diode 93 and may, for example, be 20 V. The voltage value (−U3 +U1 +U4), as shown in FIG. 3c in the voltage G1 varies with a readjustment of the voltage U1, so that the beam current strength during the line retrace is independent of the adjustment.

It is a requirement for the heater voltage +U2, which is switched with the line frequency in the pulse heater voltage source (35, 36, 37, 39), to be of such a value that a sufficient heater power is applied during each time 5.5 μs of each line period TH=64 μs so that the cathode filament 2 of the pick-up tube 1 of FIG. 1 is kept at an average optimal temperature. For a cathode filament 2 in the form of, for example, a tungsten strip the optimum temperature for the electron emission can be assumed to be approximately 1500° K., a 5 to 10% variation thereof having in practice no noticeable influence on the electron beam 11, which scans the target plate 12. An equation for a particular cathode filament 2 supplied with a constant d.c. voltage Udc or with the switched d.c. voltage U2 is $U2 = Udc\ (64/5.5)^{\frac{1}{2}} = 3.4$ Udc. As since the efficiency between the electron emission and the heater power at a directly heated cathode is higher than in the case of an indirectly heated cathode, the ultimately required switched voltage U2 for the directly heated cathode is below the obtained value (3.4 times the constant d.c. voltage) since it is calculated with respect to the same, directly heated cathode. Starting from a heater voltage of, typically, 6.3 V d.c. for an indirectly heated cathode, a switched heater voltage U2 of between approximately 10 and 15 V can be used for a directly heated cathode having the same electron emission. If, as mentioned for non-ACT operation, the whole line blanking period TB is utilized for the heater voltage supply instead of half the line blanking period TB, it follows that $U2 = (64/11)^{\frac{1}{2}} Udc = 2.4$ Udc, resulting in a heater voltage which is 0.7 times lower.

Figure 4:
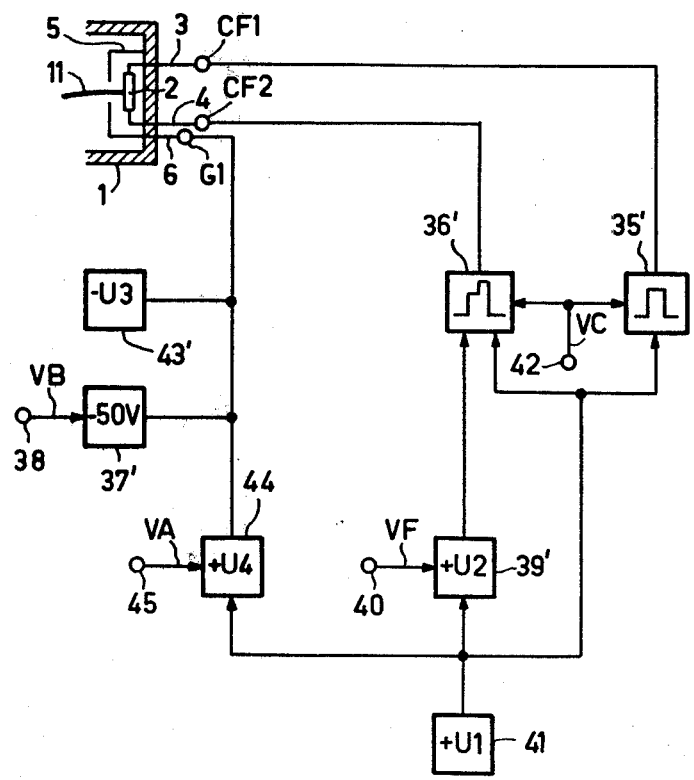
FIG. 4 shows, partly in the form of a block diagram, a second embodiment of a television camera according to the invention, which operates with control electrode blanking.
Figure 5:
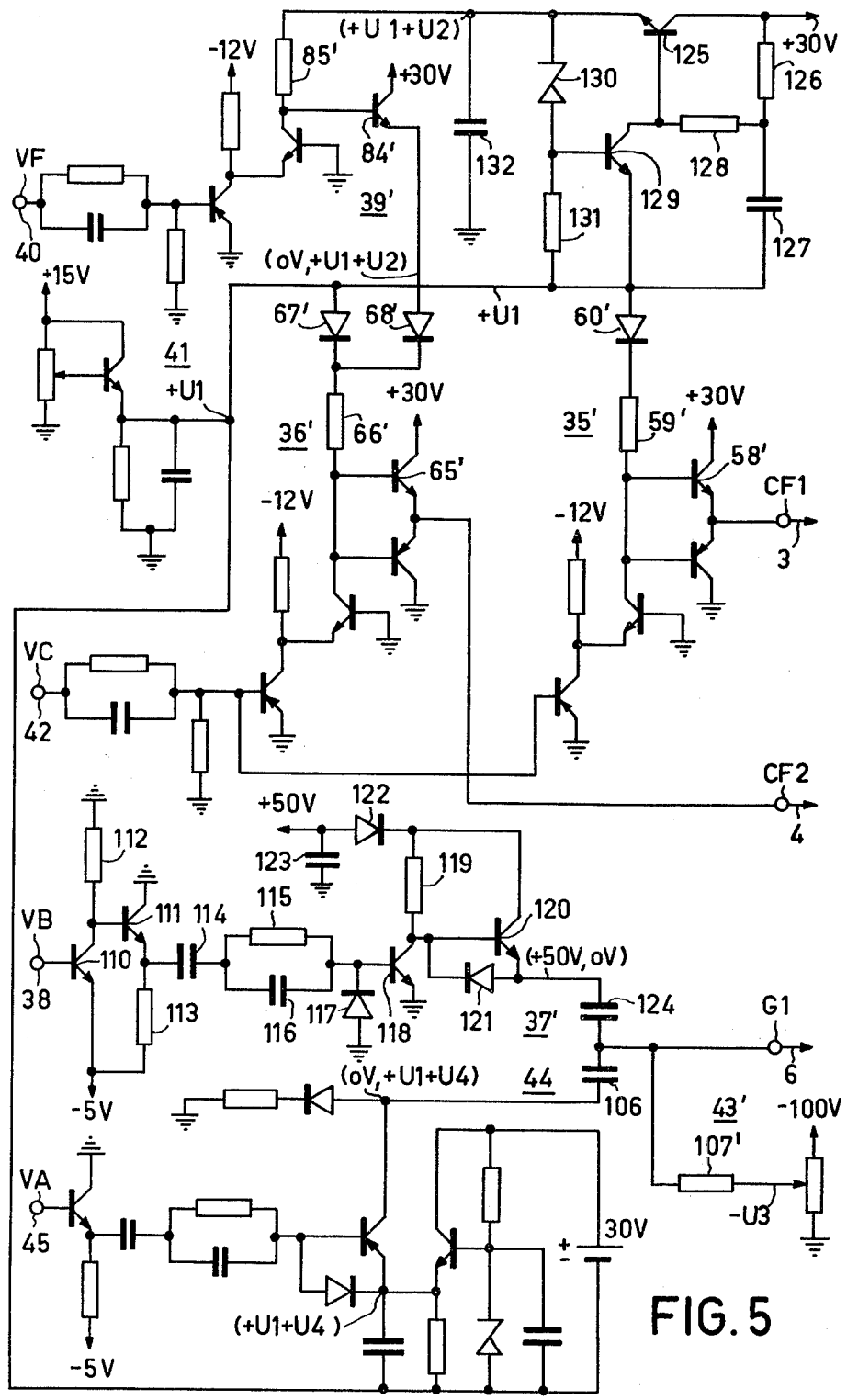
FIG. 5 shows the blocks of FIG. 4 in greater detail and FIGS. 6a, 6b and 6c show some signals produced in the camera of FIGS. 4 and 5 as a function of the time.
Figure 6:
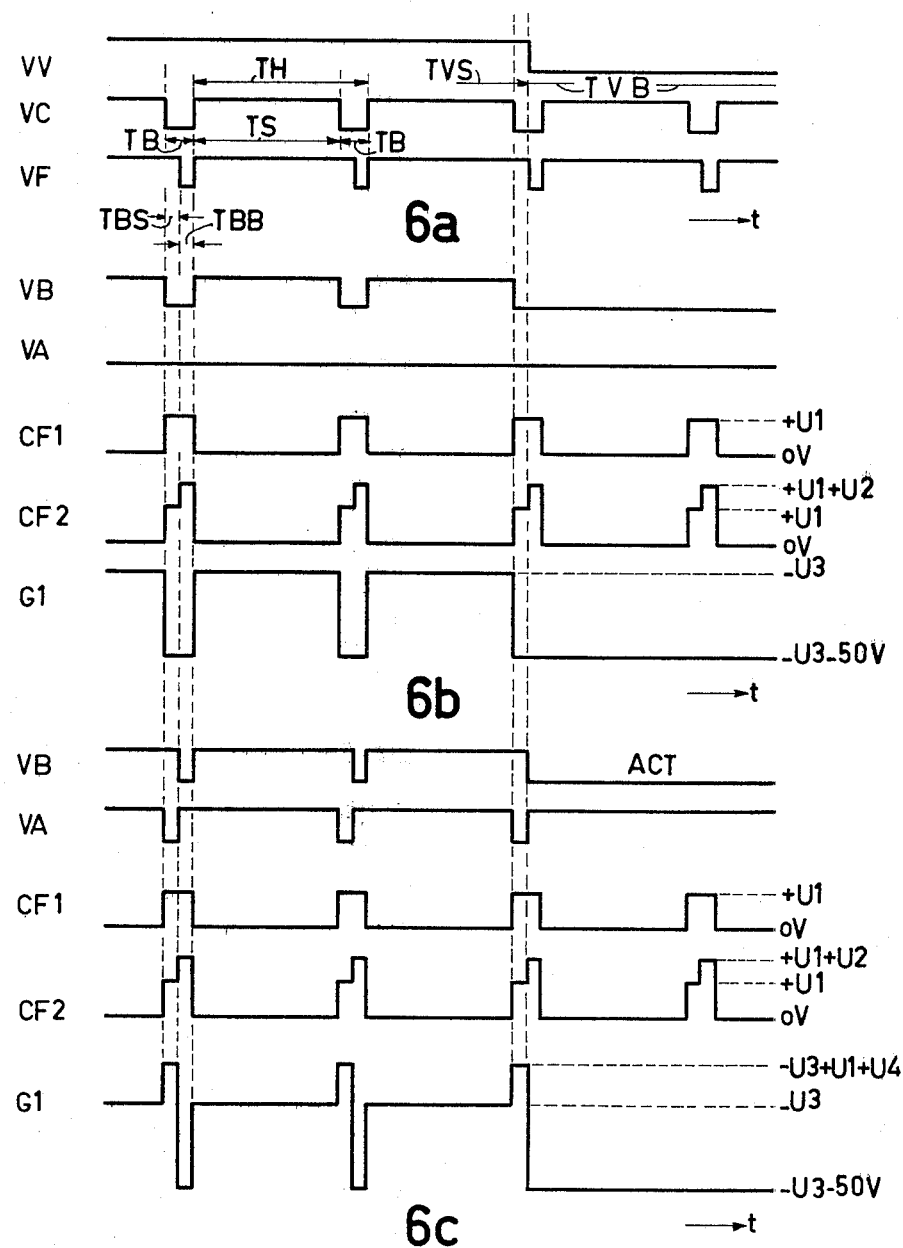

FIG. 4 shows, relative to FIG. 1, the altered portion of a block diagram associated with a camera according to the invention, wherein control electrode blanking is used for the electron beam 11 in the pick-up tube 1. FIG. 5 is the detailed diagram of FIG. 4, while FIG. 6a, 6b and 6c show signals as a function of the time t. Blocks which are not altered with respect to the blocks shown in FIGS. 1 and 2 have been given the same reference numerals and altered blocks are indicated by means of reference numerals provided with an accent. To perform the control electrode blanking, the voltage source 37' for producing a −50 V voltage is connected, in FIG. 4, to the control electrode terminal 6. The voltage source 39' having the voltage +U2 is connected to the output of the voltage source 41 which supplies the voltage +U1. For the supply of voltage, the voltage source 35' is only connected to the output of the voltage source 41, while the voltage source 36' is connected to the outputs of the voltage sources 39' and 41.

From the FIG. 5 and 2 it appears that in the voltage source 43', the diode 108 of the voltage source 43 has been omitted and that the potentiometer tap is connected to the terminal 6 through the resistor 107' only. It is necessary to omit the diode 108, as shown in FIG. 6c, since positively and negatively going pulses are produced in the voltage G1 with respect to the value −U3, while in the voltage G1 of FIG. 3c, only positively going pulses are produced when diode 108 is cut-off.

From FIG. 5 it appears that the voltage sources 35' and 36' deviate in two respects from the sources 35 and 36 of FIG. 2: the collectors of the transistors 58' and 65' are connected to terminals which carry a +30 V voltage and the resistors 59' and 66' are connected to the cathodes of the diodes 60' and 67', 68' only.

The voltage source 37' of FIG. 5 has been changed very much with respect to FIG. 2. The emitter of a transistor 110 is connected to a terminal which carries a −5 V voltage and the collector is connected directly to the base of a npn transistor 111 and to ground through a resistor 112. The collector of transistor 111 is connected to ground and the emitter thereof is connected, through a resistor 113, to the terminal which carries the voltage of −5 V, and, through a capacitor 114, to the parallel arrangement of a resistor 115 and a capacitor 116, whose other side is connected to the cathode of a diode 117, and to the base of a npn transistor 118. The anode of the diode 117 is connected to ground which also applies to the emitter of the transistor 118, which has its collector connected to a resistor 119, the base of a npn transistor 120 and the cathode of a diode 121. The collector of the transistor 120 is connected to the other terminal of the resistor 119 and is further connected to the cathode of a diode 122. The anode of the diode 122 is connected directly to a terminal carrying a +50 V voltage and to ground through a capacitor 123. The emitter of the transistor 120 and the anode of the diode 121 are connected to the terminal 6 through a capacitor 124, at which the control electrode voltage G1 is produced.

For the operation of the voltage source 37', it follows that at a voltage which is less negative than −5 V at the input 38 (signal VB), the transistor 110 conducts, so that the transistor 111 and the transistor 118 are cut-off. A voltage of approximately +50 V is then present at the base of the transistor 120 and consequently also at the emitter thereof. A voltage which is more negative than −5 V at the input 38 (signal VB), blocks the transistor 110, so that the transistor 111, and also the transistor 118, conducts. Through the diode 121, which is then conductive, approximately the ground potential is present at the junction of the anode of the diode 121 and the capacitor 124, the transistor 120 then being cut-off. It appears that a voltage jump is produced which is indicated by (+50 V, 0 V) in FIG. 5.

The components 78 to 85, inclusive, shown in FIG. 2 in the voltage source 39, are also used in the voltage source 39' of FIG. 5. The collector of the transistor 84' is connected to a terminal which carries a voltage of +30 V and the resistor 85' is not connected directly to a voltage-carrying terminal but to a terminal which carries a voltage of +30 V through the emitter-collector path of a npn transistor 125. The terminal carrying the +30 V voltage is connected to the output of the voltage source 41 which carries the voltage of +U1 through a resistor 126 in series with a capacitor 127. The base of the transistor 125 is connected to the junction of the resistor 126 and the capacitor 127 through a resistor 128 and is further connected to the other terminal of the capacitor 127 through the collector-emitter path of a npn transistor 129. Through a Zener diode 130 the emitter of the transistor 125 is connected to the base of the transistor 129 which is connected to the emitter thereof through a resistor 131. The emitter of the transistor 125 is connected to ground through a capacitor 132. A voltage (+U1 +U2) is present across the capacitor 132, the voltage +U2 being derived from the +30 V voltage by means of the voltage stabilization circuit (125–132).

The presence of the higher voltage and the lower voltage, respectively, in the signal VF (FIG. 6a) at the input 40 results in that, in the manner already described for the voltage sources 37 and 39 of FIG. 2, the voltage source 39' supplies the ground potential and the voltage (+U1 +U2), respectively, which is indicated in FIG. 5 by (0 V, +U1 +U2).

The explanation of the operation of the voltage sources 35', 36', 39' and 44 shown in FIG. 5 is based on the description of the voltage sources 35, 36, 39 and 44 shown in FIG. 2. The voltage sources 35', 36' and 39' form a pulse heater voltage source (35', 36', 39').

For non-ACT operation (FIG. 6b), the voltage source 44 is not switched so that it does not affect the voltage G1 at the terminal 6. The occurrence of the higher voltage and the lower voltage, respectively, in the signal VB of FIG. 6b, a voltage of +50 V and 0 V, respectively, then being present at the anode of the diode 121, results in the voltage G1, shown in FIG. 6b, having the 50 V voltage jump between the voltage −U3 coming from the voltage source 43' and the voltage (−U3 −50 V).

In the described manner the transistors 58' and 65' of the voltage sources 35' and 36', respectively, conduct at the falling pulse in the signal VC of FIG. 6a. In the period of time TBS approximately the voltage value +U1 is present in the voltages CF1 and CF2, respectively, through the diodes 60' and 67', while in the period of time TBB the falling pulse in the signal VF of the voltage source 39' gives the voltage value (+U1 +U2) in the voltage CF2, through the then conducting diode 68', which is shown in FIG. 6b for the voltages CF1 and CF2. From the voltages CF1 and CF2 it appears that the heater voltage supply (U2) occurs with the line-frequency periodicity in both the field scanning period TVS and in the field blanking period TVB.

For ACT-operation (FIG. 6c), the voltage sources 35', 36' and 39' operate in the same manner as for non-ACT operation, giving the same voltages CF1 and CF2 in FIG. 6b and FIG. 6c. The falling pulse in the signal VA in a line retrace period TBS of the field scanning period TV gives in the manner described for FIG. 3c the pulse of −U3 to (−U3 +U1 +U4) Volts in the signal G1 of FIG. 6c, through the capacitor 106. Thereafter the falling pulse occurs in the signal VB in the beam blanking period TBB, giving the pulse of −U3 to (−U3 −50 V) in the voltage G1 through the capacitor 124.

The pulses shown in FIG. 3b ( and also in FIG. 3c) in the voltages CF1 and CF2 which have the voltage value of +50 V, are required for performing the cathode blanking of the electron beam 11 in the pick-up tube 1 of FIG. 1. When control electrode blanking as shown in FIG. 4 and FIG. 5 is used, the supply of voltage to the cathode filament 2 can be simplified. Namely, the pulses shown in FIG. 6b in the voltages CF1 and CF2 which have the voltage value of +U1 V are not required and they are produced only because non-ACT operation as well as ACT-operation can be utilized in the implementation of FIG. 4 and 5. In a non-switchable implementation for non-ACT operation only, the cathode filament terminal 3 in FIG. 4 can be connected to ground (voltage CF1 is equal to 0 V) and the cathode filament terminal 4 can be connected to a pulse heater voltage source which is switched with the line frequency and which produces pulses having a voltage value U2, which pulses may have a duration equal to the entire line blanking period TB.

What is claimed is:

1. A television camera comprising a pick-up tube having a directly heated cathode for emitting, while being heated, an electron beam, a control electrode for the electron beam, deflection means and a target plate which is scanned line-by-line and field-by-field with periodical scanning and blanking periods by the electron beam under the control of the deflection means, said directly heated cathode having a cathode filament, and a heater voltage source connected to said cathode filament, the heater voltage source being a pulse voltage source, wherein the pulse heater voltage produced thereby is present in at least a portion of the line blanking periods and absent in the line scanning periods.

2. A television cameras as claimed in claim 1, wherein the line frequency periodicity of the pulse voltage source is the same in the field scanning periods as in the field blanking periods.

3. A television camera as claimed in claims 1 or 2, wherein said cathode filament has a first and a second cathode filament terminal and wherein the pulse voltage source comprises a first, a second and a third voltage source, the outputs of said first and second voltage sources being connected to said first and said second cathode filment terminals respectively, the first and the second voltage sources each being provided with an input for receiving a first line-frequency switching signal, while the second voltage source is provided with another input, which is connected to the output of the third voltage source for supplying the pulse heater voltage, said third voltage source being provided with an input for receiving a second line-frequency switching signal.

4. A television camera as claimed in claim 3, in which said pulse voltage source further comprises a fourth and a fifth voltage source, and wherein each one of the first and the second voltage sources in the pulse voltage source includes an additional input which is connected to the output of the fourth voltage source, said fourth voltage source being provided with an input for receiving a switching signal having line-frequency pulses in a field scanning period and a pulse of the duration of the field blanking period, the fourth voltage source being active for the production of pulses which blank the electron beam in the pick-up tube, and wherein the control electrode of the pick-up tube has a terminal which is connected to the output of the fifth voltage source, which supplies a constant, adjustable d.c. voltage.

5. A television camera as claimed in claim 3, in which said pulse voltage source further comprises a fourth and a fifth voltage source and wherein the control electrode of the pick-up tube has a terminal which is connected to the output of the fourth voltage source, which includes an input for receiving a switching signal having line-frequency pulses in a field scanning period and a pulse of the duration of the field blanking period, the fourth voltage source being active for the production of pulses which blank the electron beam in the pick-up tube, and wherein the terminal of the control electrode is further connected to the output of the fifth voltage source which supplies a constant, adjustable d.c. voltage.

6. A television camera as claimed in claim 3 in which said pulse voltage source further comprises a sixth and a seventh voltage source, and wherein each one of the first and the second voltage sources in the pulse voltage source is provided with an input which is connected to the output of the sixth voltage source, which produces a constant, adjustable d.c. voltage, and wherein the seventh voltage source includes an input connected to the output of the sixth voltage source, and an output connected to the terminal of the control electrode, the seventh voltage source further including another input for receiving a switching signal having line-frequency pulses in a field scanning period.

7. A television camera as claimed in claim 6, wherein the output of the sixth voltage source is connected to an input of the third voltage source present in the pulse heater voltage source.

8. A television camera as claimed in claim 4 in which said pulse voltage source further comprises a sixth and a seventh voltage source, and wherein each one of the first and the second voltage sources in the pulse voltage source is provided with an input which is connected to the output of the sixth voltage source, which produces a constant, adjustable d.c. voltage, and wherein the seventh voltage source includes an input connected to the output of the sixth voltage source, and an output connected to the terminal of the control electrode, the seventh voltage source further including another input for receiving a switching signal having line frequency pulses in a field scanning period.

9. A television camera as claimed in claim 5 in which said pulse voltage source further comprises a sixth and a seventh voltage source, and wherein each one of the first and the second voltage sources in the pulse voltage source is provided with an input which is connected to the output of the sixth voltage source, which produces a constant, adjustable d.c. voltage, and wherein the seventh voltage source includes an input connected to the output of the sixth voltage source, and an output connected to the terminal of the control electrode, the seventh voltage source further including another input for receiving a switching signal having line-frequency pulses in a field scanning period.

10. A television camera as claimed in claim 8, wherein the output of the sixth voltage source is connected to an input of the third voltage source present in the pulse heater voltage source.

11. A television camera as claimed in claim 9, wherein the output of the sixth voltage source is connected to an input of the third voltage source present in the pulse heater voltage source.

* * * * *